United States Patent
Taguchi et al.

(10) Patent No.: US 6,926,849 B2
(45) Date of Patent: Aug. 9, 2005

(54) SOLDER PASTE

(75) Inventors: Toshihiko Taguchi, Saitama (JP); Kunihito Takaura, Mouka (JP); Setsuko Tadokoro, Mouka (JP); Masahiko Hirata, Kashiba (JP); Hisahiko Yoshida, Ibaraki (JP); Takashi Nagashima, Kyoto (JP)

(73) Assignees: Senju Metal Industry Co., Ltd., Tokyo (JP); Matsushita Electric Industrial Co., Ltd., Kadoma (JP)

( * ) Notice: Subject to any disclaimer, the term of this patent is extended or adjusted under 35 U.S.C. 154(b) by 57 days.

(21) Appl. No.: 10/432,844
(22) PCT Filed: Nov. 29, 2001
(86) PCT No.: PCT/JP01/10431
§ 371 (c)(1), (2), (4) Date: Nov. 3, 2003
(87) PCT Pub. No.: WO02/43916
PCT Pub. Date: Jun. 6, 2002

(65) Prior Publication Data
US 2004/0069974 A1 Apr. 15, 2004

(30) Foreign Application Priority Data
Nov. 29, 2000 (JP) .......................... 2000-362985

(51) Int. Cl.$^7$ ........................ H01B 1/02; B23K 35/363
(52) U.S. Cl. .......................... 252/512; 148/24; 420/557; 420/562
(58) Field of Search .............................. 252/512, 520.1, 252/521.6; 148/24; 420/557, 560, 561, 562

(56) References Cited

FOREIGN PATENT DOCUMENTS

| EP | 1348513 | * 10/2003 |
|---|---|---|
| JP | 6015483 | 1/1994 |
| JP | 8155676 | 6/1996 |
| JP | 3105505 | 11/2000 |
| JP | 2002-045993 | 2/2002 |

* cited by examiner

Primary Examiner—Mark Kopec
(74) Attorney, Agent, or Firm—Michael Tobias

(57) ABSTRACT

A solder paste comprising a powder of a Zn-containing Sn-based, lead-free solder mixed with an activator-containing rosin-based flux to which 0.5–10.0 wt % of isocyanuric acid or a haloalkyl ester thereof is added can prevent the formation of solder balls and voids during reflow soldering and exhibit good solderability. A solder paste comprising a powder of an Ag- or Zn-containing Sn-based, lead-free solder mixed with an activator-containing rosin-based flux to which 0.01–10.0 wt % of a salicylamide compound also does not exhibit a change in viscosity and exhibits good solderability.

12 Claims, No Drawings

SOLDER PASTE

TECHNICAL FIELD

This invention relates to a solder paste for use in soldering of electronic devices and in particular to a solder paste of an Sn-based, lead-free solder.

BACKGROUND ART

Sn—Pb alloys have continued to be used as solder since ancient times. They have advantages of low melting points and good solderability. For example, a eutectic Sn63%-Pb37% solder, the most popular solder, has a melting point of 183° C.

The eutectic Sn—Pb solder has also been commonly used in soldering of electronic devices. Recently, surface mount technology (SMT) has been employed increasingly to mount electronic parts on a printed board due to the capability of SMT to reduce size, enhance packaging density and performance, and lower operating costs. In SMT, soldering is typically carried out by the reflow soldering method using a solder paste (also called a cream solder) which comprises a solder powder uniformly mixed with a soldering flux, particularly a rosin-based flux. In general, the reflow soldering method comprises feeding a solder paste onto a printed board by printing or dispensing (discharging through a dispenser), temporarily fixing chip-type electronic parts on the solder paste by use of the adhesion of the paste, and heating the printed board with the electronic parts thereon in a reflow furnace to allow the solder to melt, whereby the parts are fixed and electrically connected to the printed board.

Printed boards withdrawn from waste electronic devices by disassembly are frequently discarded by pulverizing in a shredder and burying in the ground. When rain of recent years which has been acidified (i.e., acid rain) contacts the pulverized printed boards buried in the ground, the lead (Pb) in the Sn—Pb solder may be dissolved out and contaminate underground water. If a human or animal continues to drink a lead-containing water for long years, there is the concern that lead is accumulated in its body to cause lead poisoning. Therefore, it has been recommended in the art to use a lead-free solder, which is completely free from lead, in soldering of electronic devices.

Lead-free solders should consists of element which are harmless to humans. For example, Cd should not be used, even though it has an effect of lowering a melting temperature. Lead-free solders which are promising at present are Sn-based alloys which comprise a major proportion of Sn and one or more alloying elements such as Ag, Cu, Bi, In, Sb, or Zn.

Among these, Ag-containing Sn-based solders (hereunder referred to as Sn—Ag based solders) such as an Sn—Ag alloy and an Sn—Ag—Cu alloy have the advantage of being easy to handle since they have relatively good wettability as a lead-free solder. However, Sn—Ag based, lead-free solders have a melting point on the order of 220° C., which is approximately 30–40° C. higher than that of a eutectic Sn—Pb alloy, so the working temperature (heating temperature in soldering) also becomes higher correspondingly. Therefore, they may not be suitable for use in soldering of some thermally sensitive electronic parts.

Zn-containing Sn-based solders (hereunder referred to as Sn—Zn based solders) are advantageous from the standpoints of safety and economy, since Zn is not only an element which is harmless and indispensable for the human body but is found underground in large amounts so that its cost is low compared to Ag, Cu, Bi, In, and the like. A typical alloy composition of an Sn—Zn lead-free solder is Sn-9Zn. This solder has a melting point of 199° C., which is approximately 20° C. lower than that of an Sn—Ag lead-free solder, so it also has the advantage that it can be used for soldering thermally sensitive electronic parts to which an Sn—Ag based, lead-free solder cannot be applied.

In a lead-free solder paste comprising a powder of an Sn-based, lead-free solder including an Sn—Ag and Sn—Zn based solder (such solder paste being hereunder referred to as Sn-based, lead-free solder paste) mixed with a rosin-based flux, a reaction between the solder powder with a constituent of the flux, particularly with an activator which is normally present in the rosin-based flux, may occur readily due to the high content of the active Sn metal in the solder powder, compared to a conventional solder paste prepared from an Sn—Pb solder powder and the same rosin-based flux. Such a reaction may result in a change in viscosity of the solder paste and cause the problem that the solder paste cannot satisfactorily be fed by printing or dispensing.

As a countermeasure, an approach can be employed, particularly in a solder paste of an Sn—Ag based solder, in which the viscosity change is controlled by decreasing the amount of an activator, e.g., an amine hydrohalide and organic acid, added to the rosin-based flux, thereby suppressing a reaction of the flux with the solder powder. However, since this approach weakens the activity of the flux, it may cause the formation of solder balls and adversely affect the wettability of the solder. Accordingly, there is a need to control the viscosity change of an Sn-based, lead-free solder paste without decreasing the amount of an activator in the flux.

In addition to the above-described problem, a solder paste comprising a powder of an Sn—Zn based, lead-free solder (hereunder referred to as an Sn—Zn based solder paste) has another problem. Zn is a metal which is susceptible to oxidation due to its high ionization tendency. Therefore, an oxide layer is formed on the surface of the solder powder which contacts air, and it makes the wettability of the solder powder poor. In particular, in an Sn—Zn based solder paste prepared by use of a rosin-based flux, the surface oxidation of the solder powder by a reaction with the flux becomes even more severe, so soldering defects including formation of voids due to extremely poor wettability of the solder and formation of solder balls may occur frequently.

In order to increase the wettability of the solder in the Sn—Zn based solder paste, it is conceivable to use a rosin-based flux containing an increased amount of an activator. However, as described above, the activator tends to react with the solder powder prior to soldering, and an increase in the amount of an activator may cause the viscosity of the solder paste to increase rapidly and interfere with the feeding of the solder paste by printing or dispensing.

In an Sn—Zn-based solder paste, an approach in which the surface of the Sn—Zn based solder powder is coated with a suitable material prior to mixing with the flux to prevent the solder powder from reacting with the flux and causing surface oxidation may be employed. As the coating material, a precious metal such as Au or Pd, an inorganic oxide formed from a hydrolyzable organosilicon compound or the like, or an organic substance such as an imidazole or a triazole can be used.

However, such coating adds to the manufacturing costs of a solder paste. Furthermore, some types and methods of coating may promote oxidation of solder powder during the coating operation, and the method is not necessarily effective at improving solder wettability or solderability.

DISCLOSURE OF THE INVENTION

It is an object of the present invention to improve the solderability of a Sn-based, lead-free solder paste comprising a powder of an Sn-based, lead-free solder mixed with a rosin-based flux, particularly one containing an activator.

Another object of the present invention is to provide such an Sn-based, lead-free solder paste exhibiting a minimized viscosity change and having good wettability.

A further object of the present invention is to provide an Sn-based, lead-free solder paste, and in particular an Sn—Zn based solder paste, which has good solder wettability and solderability in which the surface oxidation of the solder powder which is encountered significantly with a conventional Sn—Zn based solder paste can be prevented without coating of the solder powder.

In one aspect, the present invention provides a solder paste comprising a powder of an Sn-based, lead-free solder mixed with a rosin-based flux, wherein the rosin-based flux contains 0.5–10.0 wt % of at least one isocyanuric compound selected from isocyanuric acid and derivatives thereof having no hydroxyl group.

In another aspect, the present invention provides a solder paste comprising a powder of an Sn-based, lead-free solder mixed with a rosin-based flux, wherein the rosin-based flux contains 0.01–10.0 wt % of at least one salicylamide compound selected from salicylamide and derivatives thereof.

DETAILED DESCRIPTION OF THE INVENTION

A rosin-based flux for use in a solder paste is normally prepared by dissolving a rosin in a solvent along with one or more additives such as an activator and a thixotropic agent. In particular, the type and amount of the activator have a great effect on the solder wettability of the solder paste.

In general, an Sn-based, lead-free solder has poor solder wettability compared to an Sn—Pb solder. For example, compared to the spreading factor of an Sn—Pb solder, an Sn—Ag lead-free solder spreads only about 80% as much as an Sn—Pb solder. An Sn—Zn lead-free solder has an even worse spreading factor, and it only spreads about 70% as much as an Sn—Pb solder.

Therefore, it seems to be advantageous for an Sn-based, lead-free solder paste to incorporate a large amount of an activator to improve the wettability. However, as described previously, this causes the viscosity of the solder paste to increase rapidly due to a reaction between the activator and the solder powder. As a result, the solder paste soon becomes difficult to be fed by printing or through a dispenser, and its shelf or service life becomes extremely short. Therefore, unless the solder powder is protected by surface coating, the amount of the activator should be decreased, resulting in poor wettability. In particular, a conventional Sn—Zn based, lead-free solder paste has very poor wettability.

In reflow soldering using a solder paste, soldering is performed in a heating furnace called a reflow furnace. Heating in a reflow furnace is normally two-step heating in which preheating is first carried out at a temperature of 150–170° C. for 30–100 seconds followed by main heating at a temperature of 20–50° C. above the melting temperature of the solder. Preheating is carried out in order to vaporize the solvent in the solder paste and to simultaneously alleviate heat shock to electronic parts to be soldered.

Materials for use in a solder paste of a eutectic Sn—Pb solder, which is still most popular at present, are designed so as to exhibit optimal performance in this two-step heating. For example, an activator begins to react partially from around 150° C., which is the preheating temperature, and completely reacts at around 210–230° C., which is the main heating temperature for an Sn—Pb solder. In a solder paste of an Sn—Pb solder, even if the activator used becomes active at a temperature as low as 150° C., oxidation of the solder powder does not occur significantly during the preheating stage due to the low reactivity of Pb.

In contrast, it was found that with an Sn—Zn based, lead-free solder paste, the zinc exposed on the surface of the Sn—Zn based solder powder can readily combine with the oxygen present in the reflow furnace to form a relatively thick surface oxide layer on the solder powder, even during the preheating stage. If the solder powder having such an oxide layer formed by oxidation during preheating is subjected to main heating, the solder powder melts with the oxide layer covering its surface, so it remains without spreading as solder balls. In addition, the flux is mostly consumed by reacting with the surface oxide layer on the solder powder and loses its activity, resulting in poor wettability and causing the formation of voids in the interior of the resulting soldered joints. The formation of these solder balls and voids becomes a cause of soldering defects.

As already stated, due to the high ionization tendency and susceptibility to oxidation of Zn, an Sn—Zn based, lead-free solder is highly susceptible to surface oxidation. In particular, it is conjectured that with a solder paste, the solder is in the form of a powder having an extremely large surface area, so oxidation of the Sn—Zn based solder becomes severe during the preheating stage, resulting in a markedly adverse effect on solderability.

The oxidation of an Sn—Zn based, lead-free solder powder during the preheating stage can be prevented if oxygen is nearly completely removed from the atmosphere in the furnace, as is achieved in an $N_2$ reflow furnace. However, an $N_2$ reflow furnace is expensive and has high running costs.

It has been found that the oxidation of an Sn—Zn based, lead-free solder powder during preheating can be prevented by adding at least one isocyanuric compound selected from isocyanuric acid and derivatives thereof having no hydroxyl group to a rosin-based flux used to mix with the solder powder to prepare a solder paste, according to the present invention. Although it is not intended to be bound by a specific theory, the reason therefor is presumed to be as follows.

Isocyanuric compounds generally have high heat resistance, and they do not undergo decomposition during heating at 150–170° C. for 30–100 seconds, which are the standard preheating conditions in a reflow furnace. Therefore, if a flux which contains an isocyanuric compound is used to prepare an Sn—Zn based solder paste, the isocyanuric compound will cover the surface of the Sn—Zn-based solder powder during preheating in a reflow furnace, and surface oxidation thereof can be effectively prevented.

One of the reasons for using an isocyanuric compound having no hydroxyl group is as follows. The rosin-based flux used to prepare a solder paste contains an activator in order to improve wettability. The activator usually comprises a hydrohalide salt of an organic amine. In the presence of a polar substance, the amine hydrohalide can react with the Sn—Zn based solder powder prior to soldering, particularly at the time of printing when the solder paste is exposed to air. Due to this reaction, the viscosity of the solder paste changes and usually increases, thereby making it difficult to perform printing smoothly. This tendency is particularly strong with an Sn—Zn lead-free solder paste, so the use of a polar substance should be avoided. Since isocyanuric acid derivatives having a hydroxyl group exhibit polarity, they are not used in a flux for a solder paste according to the present invention.

If an isocyanuric acid derivative having a hydroxyl group is used in a flux for an Sn—Zn based, lead-free solder paste, the zinc on the powder surface may be oxidized to cause the surface to turn white during washing with water, which is performed subsequent to soldering. This is another reason why an isocyanuric acid derivative having a hydroxyl group is not suitable for an Sn—Zn based, lead-free solder paste.

Examples of isocyanuric compounds which are suitable for use in the present invention are isocyanuric acid and derivatives thereof having the following formula:

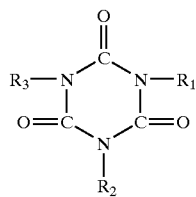

where $R_1$–$R_3$, which may be the same or different from each other, stand for hydrogen, an alkyl group optionally substituted with a halogen, or an allyl group. An alkyl group is preferably a lower alkyl group having 1 to 6 and more preferably 1 to 4 carbon atoms. A compound in which $R_1$–$R_3$ are all hydrogen is isocyanuric acid. A compound in which they are all alkyl groups is an isocyanuric acid trialkyl ester.

Specific examples of such isocyanuric compounds include isocyanuric acid, trimethyl isocyanurate, triethyl isocyanurate, tripropyl isocyanurate, butyl isocyanurate, tris(2,3-dibromopropyl) isocyanurate, triallyl isocyanurate, and the like. One or more isocyanuric compounds may be used.

Isocyanuric compounds which are preferably used in the present invention are isocyanuric acid and an isocyanuric acid tris(haloalkyl) ester (a compound of the above formula in which $R_1$–$R_3$ are haloalkyl groups) such as tris(2,3-dibromopropyl) isocyanurate. Both of these may be used together. In particular, it is preferable to use isocyanuric acid by itself or as a mixture with another isocyanuric compound.

The amount of the isocyanuric compound which is present in the rosin-based flux is in the range of 0.5–10.0 wt %. If this amount is smaller than 0.5 wt %, the effect of preventing surface oxidation of Sn—Zn-based solder powder during preheating is not substantially achieved, while if more than 10.0 wt % is added, solderability is impeded. The amount of an isocyanuric compound which is added to the flux is preferably 2–6 wt %.

In accordance with another aspect of the present invention, a solder paste comprises an Sn-based, lead-free solder powder and a rosin-based flux which contains at least one salicylamide compound selected from salicylamide (=salicylic acid amide) and derivatives thereof in an amount of 0.01–10.0 wt %.

Although it is not intended to be bound by a specific theory, it is presumed that the salicylamide compound is preferentially adsorbed by the surface of the solder powder so that it can prevent the solder powder from reacting with a constituent of the flux, particularly an activator such as an amine hydrohalide and organic acid. As a result, a change (mainly an increase) in the viscosity of the solder paste caused by such a reaction is prevented and the solder paste can be smoothly fed by printing or dispensing even after storage for a prolonged period. It has also been found that the salicylamide compounds do not interfere with the reflow properties of the solder paste.

The effect of a salicylamide compound in suppressing a change in viscosity of a solder paste is observed with a solder paste containing a powder of any Sn-based, lead-free solder including an Sn—Ag based and Sn—Zn based solder.

The salicylamide compound useful in the present invention includes salicylamide, decamethylenedicarboxylic acid disalicyloyl hydrazide, 3-(N-salicyloyl)-amino-1,2,4-triazole, and the like. If the amount of a salicylamide compound present in the rosin-based flux is less than 0.01 wt %, the above-described effect is not appreciably attained. If it is more than 10.0 wt %, melting of the solder powder may be inhibited, resulting in the formation of solder balls during soldering. The amount of the salicylamide compound in the flux is preferably 0.1–3.0 wt %.

As set forth previously, a salicylamide compound seems to exert its effect of suppressing the viscosity change of an Sn-based, lead-free solder paste through adsorption by the surface of the Sn-based, lead-free solder powder in the solder paste. Thus, instead of adding the salicylamide compound to the flux, it is also possible for the salicylamide compound to be previously adsorbed by the surface of the solder powder, using surface treatment of the solder powder by, for example, spraying with or immersion in a solution of the salicylamide compound dissolved in an appropriate volatile solvent, followed by evaporation of the solvent. The resulting Sn-based solder powder having the salicylamide compound deposited thereon by adsorption may be mixed with a rosin-based flux which does not contain a salicylamide compound to prepare a solder paste.

Thus, the present invention also provides a process for preparing a solder paste comprising subjecting an Sn-based, lead-free solder powder to surface treatment with a solution of a salicylamide compound in an organic solvent, and mixing the resulting solder powder having the salicylamide compound deposited thereon with a rosin-based flux.

In this process, the surface treatment is preferably performed such that the amount of the salicylamide compound deposited on the solder powder is in the range of 0.01–10.0 wt % based on the weight of the flux to be mixed with the surface-treated solder powder in the next step.

A flux used in a solder paste according to the present invention is a rosin-based flux having a rosin as a primary constituent. Typically, a rosin-based flux comprises a rosin, an activator, a thixotropic agent, and a solvent. Except for the addition of an isocyanuric compound or a salicylamide compound to the flux according to the present invention, the type and amount of the other constituents of the flux may be the same as for a conventional rosin-based flux, and there are no particular restrictions. It is also possible for a solder paste according to the present invention that the flux contains both an isocyanuric compound and a salicylamide compound each in an amount in the above-described range, thereby further improving the solderability of the paste.

The rosin may be a natural, unmodified rosin such as a gum rosin, a tall oil rosin, or a wood rosin, or it may be a modified rosin such as a polymerized rosin, a hydrogenated rosin, a rosin ester, or rosin-modified resin. Of course, two or more of these may be used.

As an activator, it is preferable to use a hydrohalide and particularly a hydrobromide of an organic amine. The organic amine may be primary (such as an ethyl amine), secondary (such as a diethyl amine), or tertiary (such as a triethyl amine). A heterocyclic amine such as pyridine, an aromatic amine such as aniline, an alicyclic amine such as cyclohexylamine, and a compound having two or more amino groups such as diphenylguanidine may also be used.

An organic acid activator such as stearic acid and sebacic acid or another activator may also be used, preferably in addition to an amine hydrohalide activator.

Hardened castor oil, an amide, or the like is generally used as a thixotropic agent.

Examples of a solvent are Carbitols such as butyl Carbitol and hexyl Carbitol, and alcohols such as terpineol and halogenated alcohols.

The amounts of the above-described constituents in the flux are, for example, 35–60% for the rosin, 0.5–10% for the activator, 1–10% for the thixotropic agent in weight percent. The amount of an amine hydrohalide activator is preferably 0.5–5%. Of course, the flux also contains an isocyanuric compound and/or a salicylamide compound according to the present invention. The flux may contain one or more additives other than those mentioned above.

A powder of an Sn-based, lead-free solder used in a solder paste according to the present invention may be a powder of an alloy comprised predominantly of Sn and including one or more of the elements Ag, Cu, In, Sb, and Zn. Preferably, the Sn-based, lead-free solder is an Sn—Ag alloy (e.g., Sn-3.5Ag), an Sn—Ag—Cu alloy (e.g., Sn-3Ag-0.5Cu), an Sn—Zn alloy (e.g., Sn-9Zn), or an Sn—Zn—Bi alloy (e.g., Sn-8Zn-3Bi), in which the numeral preceding an element indicates the content of the element in weight percent. These Sn-based, lead-free solders may further include one or more of Bi, In, Ag, Ni, Co, Mo, Fe, P, Ge, Ga, or the like with the object of further lowering the melting point, increasing the mechanical strength, or suppressing oxidation of the solder.

In the embodiment of the present invention in which the flux contains an isocyanuric compound, the Sn-based, lead-free solder is preferably an Sn—Zn based solder such as an Sn—Zn alloy or Sn—Zn—Bi alloy. As described previously, the isocyanuric compound present in the flux is highly effective in preventing a solder powder from oxidizing at the preheating stage in a reflow furnace. Thus, when the embodiment is applied to a solder paste comprising a powder of an Sn—Zn based, lead-free solder which is highly susceptible to oxidation, a particularly significant effect can be obtained.

On the other hand, the second embodiment of the present invention in which the flux contains a salicylamide compound can satisfactorily be applied to a solder paste comprising a powder of any Sn-based, lead-free solder including an Sn—Ag based alloy and an Sn—Zn based alloy, although its effect with an Sn—Zn solder is generally greater than with an Sn—Ag solder.

The shape of the solder powder is not critical, but normally it is a spherical powder which can be prepared by the centrifugal atomizing method, the gas atomizing method, or the like. The particle size of the solder powder may be the same as for a conventional solder paste, and it is normally on the order of 200–400 mesh, but it is also possible to use a powder which is 500 mesh or finer.

The mixing ratio of the solder powder and the flux may be selected so as to obtain a solder paste having a viscosity suitable for printing or dispensing. Normally, the flux is 5–20 wt %, and the remainder is a solder powder.

The following examples are presented to further illustrate the present invention. These examples are in all respects illustrative and are not intended to be restrictive. In the examples, percentage indicates weight percent unless otherwise indicated.

EXAMPLES

Examples 1–3 and Comparative Example 1

88.5% of a spherical powder of an Sn—Zn based, lead-free solder alloy having a composition of 8% Zn, 3% Bi and a remainder of Sn was thoroughly mixed with 11.5% of a rosin-based flux having the composition shown in Table 1 to prepare a solder paste.

Using the solder paste prepared above, a reflow test was carried out in a standard reflow furnace of a two-stage heating type in which preheating and main heating were performed under usual conditions, and solderability (wettability) and the formation of solder balls were evaluated. The results are also shown in Table 1.

TABLE 1

|  | Example 1 | Example 2 | Example 3 | Comparative Example 1 |
|---|---|---|---|---|
| Flux Composition (wt %) | | | | |
| Polymerized rosin | 44 | 41 | 41 | 46 |
| Diphenylguanidine HBr | 2 | 2 | 2 | 2 |
| Hardened castor oil | 5 | 5 | 5 | 5 |
| Isocyanuric acid | 2 | — | 1 | — |
| Tris(2,3-dibromopropyl) isocyanurate | — | 5 | 4 | — |
| 2,3-Dibromo-1-propanol | 2 | 2 | 2 | 2 |
| Alpha-terpineol | 45 | 45 | 45 | 45 |
| Test results | | | | |
| Solder balls | none | a few | none | many |
| Solderability | excellent | good | excellent | poor |

As can be seen from the results in Table 1, when a solder paste of an Sn—Zn based solder which was prepared using a flux containing an isocyanuric compound according to the present invention was used for reflow soldering in air under standard conditions, it was clearly superior with respect to the amount of formation of solder balls and solderability compared to the solder paste of Comparative Example 1 in which an isocyanuric compound was not added to the flux.

Examples 4–5 and Comparative Examples 2–3

88.5% of a spherical powder of an Sn—Zn based, lead-free solder alloy having a composition of 8% Zn, 3% Bi, and a remainder of Sn or of an Sn—Ag based, lead-free solder having a composition of 3% Ag, 0.5% Cu, and a remainder of Sn was thoroughly mixed with 11.5% of a rosin-based flux having the composition shown in Table 2 to prepare a solder paste.

The solder paste prepared above was allowed to stand at room temperature to determine the shelf life, which is the period that the solder paste retains a pasty state capable of printing or dispensing, as an index to evaluate the speed of viscosity change of the solder paste. The results are also shown in Table 2 with the type of solder powder.

TABLE 2

|  | Example 4 | Example 5 | Comparative Example 2 | Comparative Example 3 |
|---|---|---|---|---|
| Flux Composition (wt %) | | | | |
| Polymerized rosin | 49 | 47 | 50 | 49 |
| Diphenylguanidine HBr | 1 | 1 | 1 | 1 |
| Stearic acid | 5 | 5 | 5 | 5 |
| Hardened castor oil | 5 | 5 | 5 | 5 |
| Decamethylenedicarboxylic acid disalicyloyl hydrazide | 1 | — | — | — |
| 3-(N-salicyloyl)-amino-1,2,4-triazole | — | 2 | — | — |
| 2,3-Dibromo-1-propanol | — | 2 | — | 2 |
| Alpha-terpineol | 38 | 38 | 38 | 38 |
| Solder powder/Test Result | | | | |
| Solder Powder | Sn—8Zn—3Bi | Sn—3Ag—0.5Cu | Sn—8Zn—3Bi | Sn—3Ag—0.5Cu |
| Shelf Life | >12 weeks | >12 weeks | 1 week | 6 weeks |

As can be seen from Table 2, conventional lead-free solder pastes of Comparative Examples 2 and 3 in which the flux did not contain a salicylamide compound lost a pasty state and became unsuitable for use after 6 weeks for the Sn—Ag based solder and even after 1 week for the more reactive Sn—Zn based solder. In contrast, the addition of a salicylamide compound to the flux according to the present invention could extend the shelf life of the solder paste by a factor of at least 2 for the Sn—Ag based solder and by a factor of at least 6 for the Sn—Zn based solder, indicating that it could effectively suppress a viscosity change of an Sn-based, lead-free solder paste.

INDUSTRIAL APPLICABILITY

The present invention provides an Sn-based, lead-free solder paste which has improved solderability and which can be satisfactorily used in a conventional reflow soldering method. As a result, in the case of, for example, a solder paste comprising a powder of an Sn—Zn based, lead-free solder which is highly susceptible to oxidation, it is possible to provide a solder paste in which formation of solder balls is suppressed and which has excellent wettability using a flux containing a proper amount of an activator as is conventional. It is also possible to suppress a change in viscosity of an Sn-based, lead-free solder paste comprising a powder of an Sn-based solder including an Sn—Ag based and Sn—Zn based solder, thereby making it possible to use such lead-free solder paste for a significantly prolonged period while making printing or dispensing operations easy.

Although the present invention has been described particularly with respect to preferred embodiments, they are merely illustrative and do not limit the present invention. It should be understood by those skilled in the art that various modifications can be made on the embodiments described above without departing from the scope of the present invention as set forth in the claims.

What is claimed is:

1. A solder paste comprising a powder of an Sn-based, lead-free solder mixed with a rosin-based flux, the rosin-based flux containing 0.01–10.0 wt % of at least one salicylamide compound selected from salicylamide and derivatives thereof.

2. A solder paste as claimed in claim 1 wherein the lead-free solder is selected from an Ag-containing Sn-based solder and a Zn-containing Sn-based solder.

3. A solder paste as claimed in claim 2 wherein the Zn-containing Sn-based solder further contains Bi.

4. A solder paste as claimed in claim 2 wherein the Ag-containing Sn-based solder further contains Cu.

5. A solder paste as claimed in claim 1 wherein the salicylamide compound is selected from salicylamide, decamethylenedicarboxylic acid disalicyloyl hydrazide, and 3-(N-salicyloyl)-amino-1, 2, 4-triazole.

6. A solder paste as claimed in claim 1, wherein the rosin-based flux further contains 0.5–10.0 wt % of at least one isocyanuric compound selected from isocyanuric acid and derivative thereof having no hydroxyl group.

7. A solder paste as claimed in claim 6 wherein the lead-free solder is a Zn-containing Sn-based solder.

8. A solder paste as claimed in claim 7 wherein the Zn-containing Sn-based solder further contains Bi.

9. A solder paste as claimed in claim 6 wherein the isocyanuric compound is selected from isocyanuric acid and an isocyanuric acid tris(haloalkyl) ester.

10. A solder paste as claimed in claim 6 wherein the rosin-based flux contains an activator.

11. A solder paste as claimed in claim 1 wherein the rosin-based flux contains an activator.

12. A solder paste as claimed in claim 11 wherein the activator comprises at least one organic amine hydrohalide.

* * * * *